3,758,481
N-[2,4-DICHLORO - 5-(HALOALKOXY)-PHENYL-CARBAMOYL]-PYRROLIDINE OR PIPERIDINE
Masahiro Hya, Junichi Saito, Nobu Fukazawa, Tatsuo Tamura, Kazuo Kurihara, and Norihisa Morishima, Tokyo, Japan, assignors to Bayer Aktiengesellschaft, Leverkusen, Germany
No Drawing. Filed June 16, 1972, Ser. No. 263,510
Claims priority, application Japan, June 30, 1971, 46/47,164
Int. Cl. C07d 29/30
U.S. Cl. 260—293.77                                    11 Claims

ABSTRACT OF THE DISCLOSURE

New urea compounds of the formula

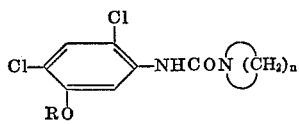

wherein

R is halogen-substituted lower alkyl, i.e., alkyl of from 1 to 6, preferably 1 to 4, carbon atoms, and
n is 4 or 5 are excellent herbicides, particularly selective herbicides usable in rice cultivation.

---

The present invention relates to certain new urea compounds, to herbicidal compositions containing them; and to their use as herbicides.

There are a number of urea herbicides which are used in commercial agricultural practice. For instance, 3-(4-chlorophenyl)-1,1-dimethylurea sold under the trade name "Monuron." 3 - (3,4 - dichlorophenyl)-1,1-dimethylurea "Diuron," 3 - (3,3'-dichlorophenyl)-1-butyl-1-methylurea "Neburon," 3 - (3,4'-dichlorophenyl-1-methoxy-1-methyl-urea "Linuron" and the like are used in current practice. In general, these urea herbicides are of non-hormonic type. When applied, they are absorbed by stems, leaves and/or roots of plants, and translocate within the bodies of plants to disturb the physiological functions of plants so that the plants will be finally killed. Thus, these herbicides are so-called "translocating herbicides."

The known herbicides have drawbacks, however. For instance, when the known herbicides as mentioned above are used in relatively moderate amounts for controlling paddy field weeds, they generally do not exhibit sufficient herbicidal effects against weeds. If the known herbicides are used in larger amounts, they induce undesired phytotoxic activities in cultivated plants.

The present invention provides urea derivatives of the general formula

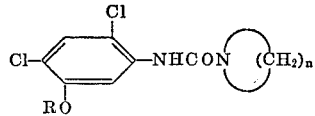

wherein

R is halogen-substituted lower alkyl, i.e., alkyl of from 1 to 6, preferably 1 to 4, carbon atoms, and
n is 4 or 5.

Examples of R include 2-chloroethyl, 3-chloropropyl, 3 - chloro - 2-methylpropyl, 2-chloropropyl, 2-chloro-1-methylpropyl, 4 - chlorobutyl, 2 - bromoethyl, 3-bromopropyl, 3 - bromo - 2 - methylpropyl, 2-bromopropyl, 2-bromo-1-methylpropyl and 4-bromobutyl, or 2,3-dichloropropyl, 4,4-dichloro-3-bromobutyl.

The present compounds exhibit excellent herbicidal activities on seedrice with good selectivity and in low concentration, whether applied by a pre or post-seeding treatment. Thus, excellent paddy field herbicides have now been developed for use in direct cultivation under irrigation. It should be noted that known urea herbicides cannot be advantageously used under such conditions.

Moreover, because of their lower phytotoxicity to rice plants under transplantation (paddy seedlings), the present compounds exhibit long residual effects. It is therefore, safe and economical to use the compounds.

The novel compounds have significant advantages over known ureas herbicidal compounds. For example, they have very specific selectivity (intergenus selectivity).

The invention also provides a process for the production of a compound of Formula I in which (a) a phenyl isocyanate of the general formula

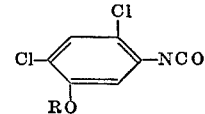

is reacted with an imine of the general formula

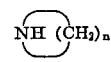

or (b) a substituted aniline of the general formula

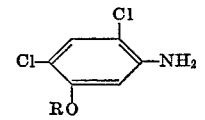

is reacted with a carbamoyl chloride of the general formula

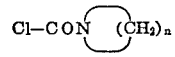

wherein R and n have the same meanings as above.

Process variant (a) is illustrated by the following formula scheme:

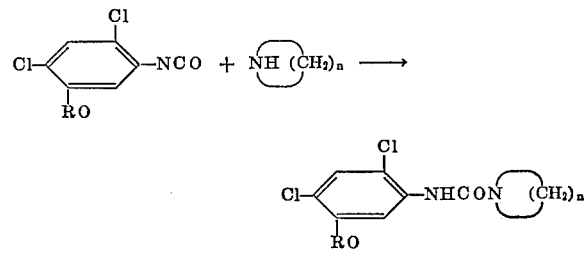

Examples of the substituted phenyl isocyanates of Formula II include:

2,4-dichloro-5-(2-chloroethoxy)-phenyl isocyanate,
2,4-dichloro-5-(3-chloropropoxy)-phenyl isocyanate,
2,4-dichloro-5-(3-chloro-2-methylpropoxy)-phenyl isocyanate,
2,4-dichloro-5-(2-chloropropoxy)-phenyl isocyanate,
2,4-dichloro-5-(2-chloro-1-methylpropoxy)-phenyl isocyanate,
2,4-dichloro-5-(4-chlorobutoxy)-phenyl isocyanate,
2,4-dichloro-5-(2-bromoethoxy)-phenyl isocyanate,
2,4-dichloro-5-(3-bromopropoxy)-phenyl isocyanate,
2,4-dichloro-5-(3-bromo-2-methylpropoxy)-phenyl isocyanate, 2,4-dichloro-5-(2-bromopropoxy)-phenyl isocyanate,
2,4-dichloro-5-(2-bromo-1-methyl-propoxy)-phenyl isocyanate, and
2,4-dichloro-5-(4-bromobutoxy)-phenyl isocyanate.

Examples of the imines of Formula III are pyrrolidine and piperidine.

The reaction is preferably carried out in an inert organic solvent.

For this purpose there may be for example be used an aliphatic or aromatic hydrocarbon (which may be halogenated), such as benzene, methylene chloride, chloroform, carbon tetrachloride, benzene, chlorobenzene, toluene and xylene; an ether such as diethyl ether, dibutyl ether, dioxan and tetrahydrofuran; or a ketone such as acetone, methylethyl ketone, methylisopropyl ketone and methylisobutyl ketone. Lower aliphatic nitriles such as acetonitrile and propionitrile can also be used.

The reaction can be performed under a wide range of temperatures. Generally, the reaction is effected at a temperature between —20° C. and the boiling point of the reaction mixture. The reaction is preferably carried out at a temperature of 0–100° C. The reaction is preferably effected under atmospheric pressure, although it may be performed under a higher or lower pressure.

Process variant (b) is illustrated by the following formula scheme:

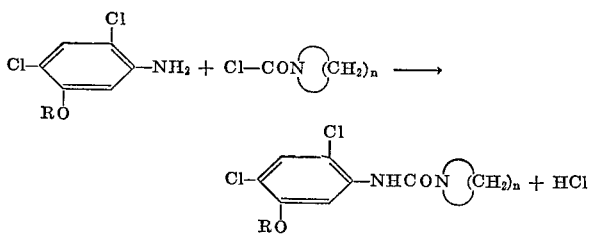

Examples of the substituted anilines of Formula IV include anilines having the same substituents as in the phenyl isocyanates mentioned above.

Examples of the carbamoyl chlorides of Formula V are pyrrolidin-1-yl carbonylchloride and piperidino carbonyl chloride.

The reaction may be preferably performed in an inert organic solvent such as one of those mentioned above. This reaction can be carried out in the presence of an acid-binding agent, if necessary. For this purpose, use can be made of carbonates and bicarbonates of alkali metals such as sodium bicarbonate, potassium carbonate or sodium carbonate; alcoholates of alkali metals such as potassium or sodium methylate or ethylate; or aliphatic, aromatic or heterocyclic tertiary bases such as triethylamine, diethylaniline and pyridine.

The reaction can be generally performed under the reaction conditions mentioned above in connection with process variant (a).

The following examples are illustrative of the preparation of the instant compounds.

EXAMPLE 1

Preparation of N-[2,4-dichloro-5-(3-chloropropyloxy)-phenylcarbamoyl]-pyrrolidine

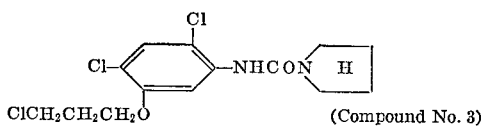

(Compound No. 3)

14.1 g. (0.05 mole) of 2,4-dichloro-5-(3-chloropropyloxy)-phenyl isocyanate were dissolved in 20 ml. of ethyl ether. To this solution, a solution of 3.6 g. (0.05 mole) of pyrrolidine in 10 ml. of ethyl ether was slowly and dropwise added while the former solution was kept stirred at a temperature of at most 25° C. After the completion of this addition, the resulting solution was further stirred for several hours and then kept at room temperature overnight.

The liquid reaction mixture was concentrated under a reduced pressure to precipitate a crystalline product. This product was recrystallized from a mixture of benzene with n-hexane. 16.7 g. of N-[2,4-dichloro-5-(3-chloropropyloxy)-phenylcarbamoyl]-pyrrolidine were obtained. Yield: 95%. Melting point: 94–97° C.

EXAMPLE 2

Preparation of N-[2,4-dichloro-5-(3-chloro-2-methylpropyloxy)-phenylcarbamoyl]-pyrrolidine

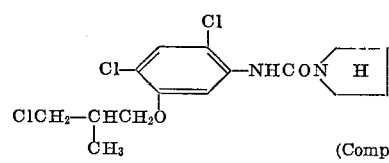

(Compound No. 5)

22.5 g. (0.075 mole) of 2,4-dichloro-5-(3-chloro-2-methylpropyloxy)-phenyl isocyanate were dissolved in 25 ml. of ethyl ether. To this solution, a solution of 5.3 g. (0.075 mole) of pyrrolidine in 10 ml. of ethyl ether was slowly and dropwise added while the former solution was kept stirred at a temperature of at most 25° C. After the completion of this addition, the resulting solution was further stirred for 1 hour and then kept at room temperature overnight.

The liquid reaction mixture was concentrated at a temperature of at most 25° C. under a reduced pressure to precipitate a crystalline product. This product was recrystallized from a mixture of benzene with n-hexane. 25.5 g. of N-[2,4-dichloro-5-(3-chloro-2-methylpropyloxy)-phenylcarbamoyl]-pyrrolidine were obtained. Yield 92%. Melting point: 119–121° C.

EXAMPLE 3

Preparation of N-[2,4-dichloro-5-(3-chloro-2-methylpropyloxy)-phenylcarbamoyl-piperidine

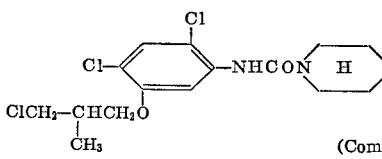

(Compound No. 6)

15 g. (0.05 mole) of 2,4-dichloro-5-(3-chloro-2-methylpropyloxy)-phenyl isocyanate were dissolved in 20 ml. of ethyl ether. To this solution, a solution of 4.3 g. (0.05 mole) of piperidine in 10 ml. of ethyl ether was slowly and dropwise added while the former solution was kept stirred at a temperature of at most 25° C. After this addition had been completed, the resulting solution was stirred at room temperature for several hours and then kept overnight.

The crystalline product, which had been precipitated, was separated by means of filtration and dried. 17.1 g. of N - [2,4-dichloro-5-(3-chloro-2-methylpropyloxy)-phenyl]-piperidine were obtained. Yield: 90%. Melting point: 64–66° C.

The above and other compounds prepared by analogous methods are listed in Table 3.

TABLE 3

| Compound No. | Structural formula | Physical constant M.P. (°C.) |
|---|---|---|
| 1 | Cl-C₆H₂(Cl)(OCH₂CH₂Cl)-NHCON(H)(C₅H₉) [piperidine] | 120–121 |
| 2 | Cl-C₆H₂(Cl)(OCH₂CH₂Cl)-NHCON(H)(C₅H₁₀) [hexahydro] | 102–103 |
| 3 | Cl-C₆H₂(Cl)(OCH₂CH₂CH₂Cl)-NHCON(H)(C₅H₉) | 94–97 |
| 4 | Cl-C₆H₂(Cl)(OCH₂CH₂CH₂Cl)-NHCON(H)(C₅H₁₀) | 78–81 |
| 5 | Cl-C₆H₂(Cl)(OCH₂CH(CH₃)CH₂Cl)-NHCON(H)(C₅H₉) | 119–121 |
| 6 | Cl-C₆H₂(Cl)(OCH₂CH(CH₃)CH₂Cl)-NHCON(H)(C₅H₁₀) | 64–66 |

As noted above, the compounds of this invention are active herbicides. The type of activity of the instant compounds depends in part on the dosage applied. When the present compounds are applied in relatively large amounts (6–20 kg. per hectare) they tend to exhibit non-selective herbicidal activity, but in smaller amounts (0.5–6 kg. per hectare) they tend to exhibit excellent selective herbicidal activity. Therefore, the compounds may be used as germination inhibitors, particularly as weed controllers.

The term "weeds" used herein denoted all plants, in the broadest sense, growing in places where they are undesirable.

When used in a suitable quantity (for example, 0.5 to 6 kg. per hectare), the compounds show excellent selective herbicidal effects, so that they are useful as herbicides for upland fields or paddy fields. They are effective to control the following plants, for instance:

Name of weeds:     Latin names
  Dicotyledons:
    Catchweed _____ Galium
    Chickweed _____ Stellaria
    Chamomila _____ Matricaria
    Gallant soldier _____ Galinsoga
    Goose-foot _____ Chenopodium
    Nettle _____ Urtica
    Groundsel _____ Senecio
    Pigweed _____ Amaranthus
    Common purslane _____ Portulaca Monocotyledons:
    Timothy grass _____ Phleum
    Bluegrass _____ Poa
    Fescue _____ Festuca
    Finger grass _____ Digitaria
    Goose grass _____ Eleusine
    Green foxtail _____ Setaria
    Cheat _____ Bromus
    Barnyard grass _____ Echinochloa However, the compounds have no phytotoxicity on the following plants:

Name of plants:     Latin names
  Dicotyledons:
    Mustard _____ Sinapis
    Cress _____ Iepidium
    Cotton _____ Gossypium
    Carrot _____ Daucus
    Bean _____ Phaseolus
    Potato _____ Solanum
    Coffee _____ Coffea
    Sugar beet _____ Beta
    Cabbage _____ Brassica
    Spinach _____ Spinacia Monocotyledons:
    Maize _____ Zea
    Rice _____ Oryza
    Oat _____ Avena
    Barley _____ Hordeum
    Wheat _____ Triticum
    Millet _____ Panicum
    Sugar cane _____ Saccharum The plant species given above are to be understood as representative examples of the genus designated in Latin. The active compounds of the present invention may be applied not only to these genera but also to other similar plants.

When the compounds according to the present invention are used as herbicides, they may be applied after dilution with water, or together with pesticidal adjuvants, or they may be formulated into various types of formulations according to the methods generally practised in the field of agricultural chemicals. For actual application, these formulations may be used as such or after dilution with water to a desired concentration.

The active compounds according to the persent invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulphonates, alkyl sulphates and aryl sulphonates; and preferred examples of dispersing agents include lignin, sulphite waste liquors and methyl cellulose.

The present compounds can be formulated in various types of formulation according to the methods generally practised in the field of agricultural chemicals. As examples of formulations there may be mentioned liquids such as emulsifiable agents, wettable powders, tablets, soluble powders, solutions, powders and granules.

The herbicidal compositions according to the invention generally contain 0.1–95% by weight, preferably 0.5 to 90% by weight, of the active compound. They may be diluted for actual application, and the ready-to-use-preparations may generally contain from 0.001 to 20% by weight, preferably from 0.005 to 10% by weight, of the active compound.

The quantity of the active components can be changed in accordance for example with the type of formulation, application method, purpose, time and place.

The present compounds, if desired, can be applied together with other agricultural chemicals such as insecticides, acaricides, nematocides, anti-virus agents, fungicides, other herbicides and plant-growth regulators, for example organo-phosphate series compounds, carbamate series compounds, dithio (or thiol) carbamate series compounds, organochloride series compounds, dinitro series, compounds, organosulphurous or organo-metallic compounds, anti-biotics, substituted diphenyl-ether series compounds, urea series compounds, triazine series compounds, and/or fertilizers.

The application of the aforementioned various formulations and the ready-to-use-preparations comprising the present active compounds may be carried out by the methods generally employed in the art, such as scattering, spraying, misting, atomizing, dusting, granule-scattering, water-surface treatment, pouring, etc.; soil treatment such as mixing, sprinkling, etc.

Further, the so-called ultra-low-volume spraying method may also be used, the content of active ingredient being up to 95 or even 100%, by weight.

The amount applied per 10 acres is generally from 3 to 1000 g., preferably 30 to 600 g., of active compound, which however may vary as necessary.

The invention therefore provides a herbicidal composition containing as active ingredient a compound according to the invention in admixture with a solid or liquefied gaseous diluent or carrier or in admixture with a liquid diluent or carrier containing a surface-active agent.

The invention also provides a method of combating weeds which comprises applying to the weeds or a weed habitat a compound according to the invention alone or in the form of a composition containing as active ingredient a compound according to the invention in admixture with a diluent or carrier.

The herbicidal activity of the compounds of this invention is illustrated by the following examples, in which the compounds of the invention are identified by numbers corresponding to those in Table 3, above.

Example (i).—Wettable agent: 15 parts of Compound 6, 80 parts of a mixture of diatomaceous earth and kaolin (1:5) and 5 parts of polyoxyethylene alkylarylether were comminuted and mixed, and then formulated into wettable powder. This formulation was diluted with water and sprayed onto weeds and/or places where weeds grew.

Example (ii).—Emulsion: 30 parts of Compound 5, 30 parts of xylene, 30 parts of methylnaphthalene and 10 parts of polyoxyethylene alkylarylether were mixed and stirred into an emulsifiable concentrate. The resulting formulation was diluted with water and applied to weeds and/or places where weeds grew.

Example (iii).—Powder: 2 parts of Compound 3 and 98 parts of a mixture of talc and clay (1:3) were comminuted and mixed to form a powder. This powder was applied onto weeds and/or places where weeds grew.

Example (iv).—Powder: 1.5 parts of Compound 5, 2 parts of organophosphate, 0.5 parts of isopropyl hydrogen phosphate and 96 parts of a mixture of talc and clay (1:3) were comminuted and mixed to form a powdery formulation. The formulation was sprayed onto weeds and/or places where weeds grew.

Example (v).—Granules: 10 parts of Compound 6, 10 parts of bentonite, 78 parts of a mixture of talc and clay (1:3) and 2 parts of lignin sulphonic acid salt were mixed and then 25 parts of water were added thereto. The mixture, after being well kneaded, was formed into granules of 20–40 mesh by means of a push-out-granulator and was dried at 40-50° C. This formulation was sprinkled onto weeds and/or places where weeds grew.

Example (vi).—Granules: 95 parts of clay granules having a particle size distribution of from 0.2 to 2 mm. were placed in a rotary mixer and, while being stirred, were exposed to a spray of 5 parts of Compound 2 that had been dissolved in an organic solvent to be uniformly wet therewith, followed by drying at a temperature in the range from 40 to 50° C. to form granules. The granules thus obtained were applied onto weeds and/or places where weeds grew.

Example (vii).—Oil: 0.5 part of Compound 1, 20 parts of methylnaphthalene, and 79.5 parts of kerosene were mixed with stirring to form an oil. This formulation was sprayed onto weeds and/or places where weeds grew.

EXAMPLE A

Test against paddy weeds in water-applied pre-emergence treatment (pot test)

Preparation of active compound:

carrier: 5 parts by weight of acetone or talc
emulsifier: 1 part by weight of benzyloxypolyglycolether 1 part by weight of active compound and the above mentioned amounts of the emulsifier and carrier were mixed and formulated into an emulsifiable concentrate or wettable powder. The formulation was diluted with water.

Test procedure: Two paddy rice seedlings (Kinmaze variety) at the 3–4 leaves stage were transplanted per hill in a Wagner plot of 1/5000 are filled with paddy soil. After the seedling had established, seeds of *Echinochloa crus-galli* leaved weeds were sown and *Eleocharis acicularis* was transplanted to the soil. Thereafter, the pot was watered to a depth of 6 cm. The active compound was administered in the form of an emulsion or wettable formulation in a fixed quantity.

After the application, the water was leached for 2 days at a rate of 2–3 cm. per day, and then maintained at a depth of about 3 cm.

After 4 weeks, the effect and the phytotoxicity to the rice were evaluated and classified, according to the following scales ranging from 0 to 5.

EVALUATION

Effect:
- 5 .......... Herbicidal rate in comparison with untreated. More than 95% dead.
- 4 ..........do.......... More than 80%.
- 3 ..........do.......... More than 50%.
- 2 ..........do.......... More than 30%.
- 1 ..........do.......... More than 10%.
- 0 ..........do.......... Less than 10% (no effect).

Phytotoxicity:
- 5 .......... Phytotoxicity rate in comparison with untreated. More than 90% (fatal damage).
- 4 ..........do.......... More than 50%.
- 3 ..........do.......... More than 30%.
- 2 ..........do.......... Less than 30%.
- 1 ..........do.......... Less than 10%.
- 0 ..........do.......... 0% (no phytotoxicity).

The test results are shown in Table 1.

EXAMPLE B

Test against direct sown paddy rice and weeds in under irrigation condition (inter genus selectivity against rice and *Echinochloa crus-galli*)

A container having a size of 500 cm.$^2$ × 9 cm. was filled with paddy soil to a depth of 4 cm. Seeds of *Echinochloa crus-galli* were mixed with the surface layer (a depth of 0.5 to 2 cm.) of the filled soil. After this treatment, the soil was and about 100 grains of seedrice, that had been immersed in another container with water for a period of two days to make them germinate uniformly were inoculated on the surface layer of the irrigated paddy soil.

After one day, the compounds of the invention were administered in the form of a wettable powder or emulsion at a fixed quantity. After 4 weeks, the effect and the phytotoxicity to the sample rice were evaluated and classified according to scales similar to those used in Example A. The results of the test are given in Table 2.

TABLE 2

Test results against direct sown paddy rice and weeds in water-applied pre-emergence treatment (inter genus selectivity test against rice and *Echinochloa crus-galli*)

| Compound No. | Amount of active ingredient (g./10 are) | Effect *Echinochloa crus-galli* | Phytotoxicity Rice |
|---|---|---|---|
| 1 | 600 | 5 | 3 |
|   | 300 | 5 | 0 |
|   | 150 | 3–4 | 0 |
| 2 | 600 | 5 | 2 |
|   | 300 | 5 | 0 |
|   | 150 | 5 | 0 |
| 3 | 600 | 5 | 3 |
|   | 300 | 5 | 1 |
|   | 150 | 5 | 0 |
| 4 | 600 | 5 | 2 |
|   | 300 | 5 | 0 |
|   | 150 | 4 | 0 |
| 5 | 600 | 5 | 0 |
|   | 300 | 5 | 0 |
|   | 150 | 5 | 0 |
| 6 | 600 | 5 | 1 |
|   | 300 | 5 | 0 |
|   | 150 | 4 | 0 |
| Control (NIP) * | 300 | 5 | 5 |
|   | 150 | 3–4 | 3 |
|   | 75 | 1 | 0 |
| Control (Diuron) * | 300 | 5 | 5 |
|   | 150 | 5 | 5 |
|   | 75 | 5 | 5 |
| No treatment | | 0 | 0 |

* Defined as in Table 1.

TABLE 1

Test results against paddy weeds in water-applied pre-emergence treatment: (pot test)

| Compound No. | Amount of active ingredient (g./10 are) | Effect *Echinochloa crus-galli* | *Cyperus microiria* | *Eleocharis acicularis* | Broad-leaves[1] | Phytotoxicity Rice |
|---|---|---|---|---|---|---|
| 1 | 500 | 5 | 5 | 5 | 5 | 0 |
|   | 250 | 4 | 5 | 5 | 5 | 0 |
|   | 125 | 3–4 | 5 | 4 | 5 | 0 |
| 2 | 500 | 5 | 5 | 5 | 5 | 0 |
|   | 250 | 5 | 5 | 4 | 4–5 | 0 |
|   | 125 | 4–5 | 5 | 4 | 4 | 0 |
| 3 | 500 | 5 | 5 | 5 | 5 | 0 |
|   | 250 | 5 | 4–5 | 4 | 4–5 | 0 |
|   | 125 | 5 | 4 | 4 | 4 | 0 |
| 4 | 500 | 5 | 5 | 5 | 5 | 0 |
|   | 250 | 5 | 5 | 4 | 4–5 | 0 |
|   | 125 | 3–4 | 4–5 | 4 | 4 | 0 |
| 5 | 500 | 5 | 5 | 5 | 5 | 0 |
|   | 250 | 5 | 4–5 | 4 | 4–5 | 0 |
|   | 125 | 4 | 4 | 4 | 4 | 0 |
| 6 | 500 | 5 | 5 | 5 | 5 | 0 |
|   | 250 | 5 | 4–5 | 4–5 | 4 | 0 |
|   | 125 | 4 | 4 | 4 | 3–4 | 0 |
| Control (NIP)[2] | 500 | 5 | 4 | 5 | 5 | 3 |
|   | 250 | 5 | 2 | 5 | 5 | 1 |
|   | 125 | 3 | 1 | 1 | 2 | 0 |
| Control (Diuron)[3] | 250 | 5 | 5 | 5 | 5 | 5 |
|   | 125 | 5 | 5 | 4–5 | 5 | 5 |
|   | 60 | 4–5 | 5 | 4 | 5 | 5 |
| No treatment | | 0 | 0 | 0 | 0 | 0 |

[1] The broad-leaved weeds denote *Monochoria viginaris*, *Rotala indica*, *Lindernia pyxidaria* and the like.
[2] NIP=2, 4-dichlorophenyl-4′-nitrophenylether.
[3] Diuron=3-(3, 4-dichlorophenyl)-1, 1-dimethylurea.

It will be understood that the specifications and examples of this invention are illustrative but not limitative and that other embodiments within the spirit and scope of the invention will suggest themselves to those skilled in the art.

What is claimed is:

1. Chlorinated phenyl urea compound of the formula

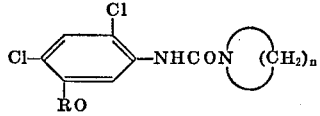

wherein

R is halogen-substituted lower alkyl of from 1 to 6 carbon atoms, and n is 4 or 5.

2. Compound as claimed in claim 1 wherein R is chloro- or bromo-substituted alkyl of from 1 to 4 carbon atoms.

3. Compound as claimed in claim 1 wherein said halogen in the R definition is chlorine or bromine.

4. Compound as claimed in claim 1 wherein said lower alkyl is substituted with 1 chloro or bromo atom.

5. Compound as claimed in claim 1 wherein said lower alkyl is substituted with 2 chloro or bromo atoms.

6. Compound as claimed in claim 1 wherein said lower alkyl is substituted with 3 chloro or bromo atoms.

7. Compound as claimed in claim 1 wherein the halogen is chloro or bromo and n is 4.

8. Compound as claimed in claim 1 wherein the halogen is chloro or bromo and n is 5.

9. Compound as claimed in claim 1 designated N-[2,4-dichloro - 5 - (3-chloropropyloxy)-phenylcarbamoyl]-pyrrolidine.

10. Compound as claimed in claim 1 designated N-[2,4-dichloro - 5 - (3-chloro-2-methylpropyloxy)-phenylcarbamoyl]-pyrrolidine.

11. Compound as claimed in claim 1 designated N-[2,4-dichloro - 5 - (3 - chloro-2-methylpropyloxy)-phenylcarbamoyl]-piperidine.

References Cited

JACS, vol. 79:1236, 1243 (1957), Beaver et al.

HENRY R. JILES, Primary Examiner

S. D. WINTERS, Assistant Examiner

U.S. Cl. X.R.

260—326.3, 453 AR, 293.88, 575